United States Patent [19]
Barber

[11] 4,192,395
[45] Mar. 11, 1980

[54] AMUSEMENT VEHICLE

[76] Inventor: Gerald L. Barber, 1209 Edwards Rd., Greenville, S.C. 29615

[21] Appl. No.: 887,741

[22] Filed: Mar. 17, 1978

Related U.S. Application Data

[63] Continuation-in-part of Ser. No. 775,889, Mar. 9, 1977.

[51] Int. Cl.² ............................................. B62K 17/00
[52] U.S. Cl. ..................................... 180/6.5; 180/218; 280/208; 280/211
[58] Field of Search .................. 180/6.48, 6.5, 10, 29; 280/206, 207, 208, 211; 74/793; 104/243, 247

[56] References Cited

U.S. PATENT DOCUMENTS

| | | | |
|---|---|---|---|
| 228,908 | 6/1880 | Langmaak et al. | 280/206 |
| 366,690 | 7/1887 | Schoening | 280/208 |
| 389,855 | 9/1888 | Rombauer | 280/208 |
| 521,786 | 6/1894 | Finch | 280/206 |
| 605,331 | 6/1898 | Nilson | 104/247 |
| 1,915,886 | 6/1933 | Gutierrez | 180/10 |
| 2,001,205 | 5/1935 | Marten | 280/208 X |
| 2,399,778 | 5/1946 | Wike | 180/10 |
| 3,094,186 | 6/1963 | Lappin et al. | 180/10 X |
| 3,260,324 | 7/1966 | Suarez | 180/10 |
| 3,386,753 | 6/1968 | Quedreux | 280/208 |
| 3,893,707 | 7/1975 | Samsel | 280/208 |
| 3,930,548 | 1/1976 | Wallraff | 180/6.5 |

Primary Examiner—Joseph F. Peters, Jr.
Assistant Examiner—Michael Mar
Attorney, Agent, or Firm—Albert L. Jeffers

[57] ABSTRACT

A vehicle, especially an amusement vehicle, in which a frame having a seat adapted for seating two occupants is located within the radial confines of a pair of relatively large coaxial spaced wheels. The frame includes rollers mounted thereon and distributed circumferentially about the inwardly facing annular surfaces of the larger wheels and engaging the same so as to rotatably support the frame within the wheels. A pair of relatively large chains are mounted circumferentially on the respective wheels within the radial confines thereof concentrically with the common axis of the wheels and are driven by crank driven sprockets carried by the frame to thereby propel the vehicle. The center of gravity of the frame, including any occupant therein, is below the common axis of the wheels so that when the sprockets are driven, the frame will first move within the wheels to create an unbalanced condition in the vehicle and the wheels will then commence rotation thereby causing the vehicle to move. The wheels can be driven at respective speeds in order to steer the vehicle.

15 Claims, 12 Drawing Figures

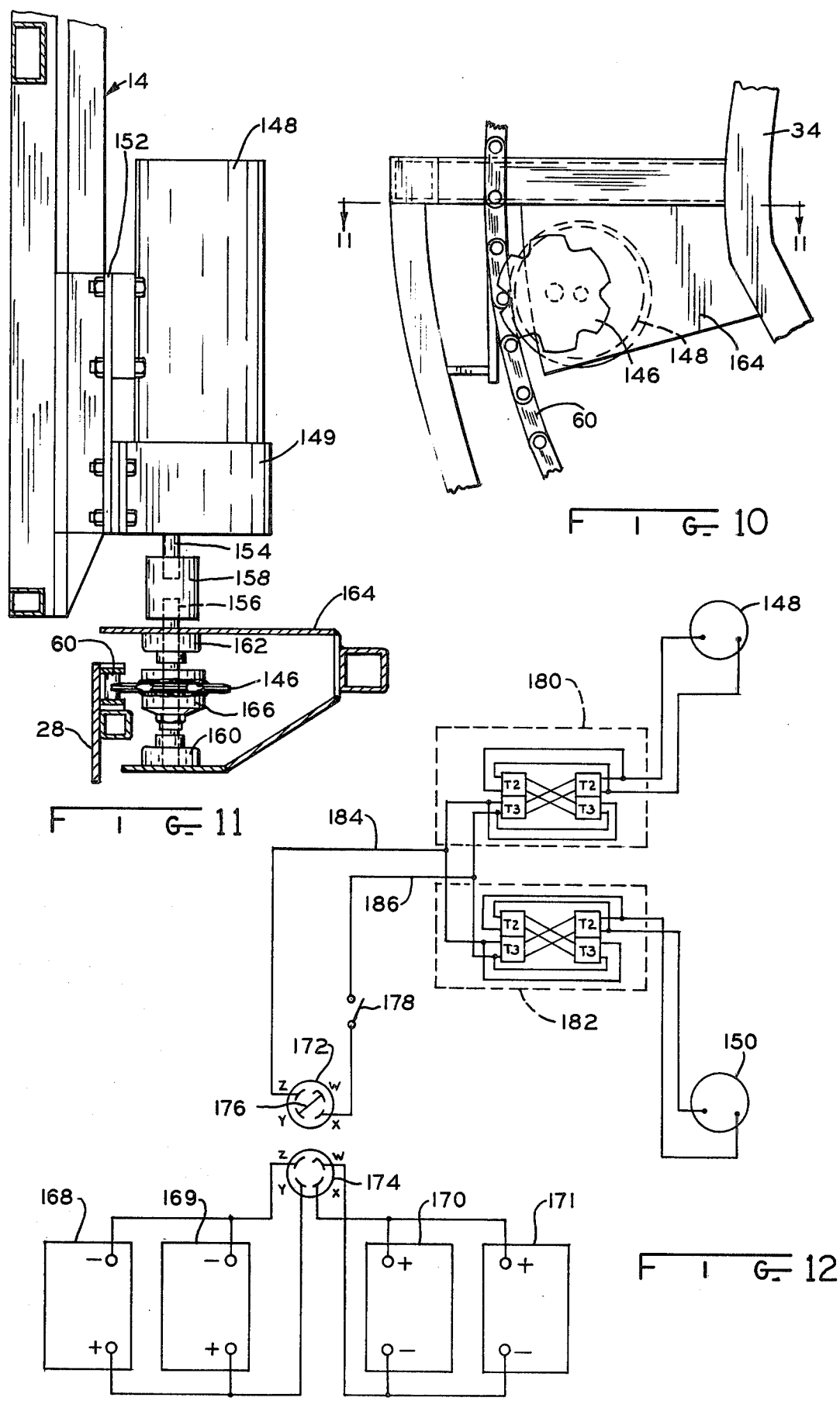

4,192,395

AMUSEMENT VEHICLE

CROSSREFERENCE TO RELATED APPLICATIONS

This is a continuation-in-part of copending application Ser. No. 775,889 filed Mar. 9, 1977.

BACKGROUND OF THE INVENTION

The present invention relates to a wheeled vehicle, and in particular to a two-wheeled amusement vehicle wherein the frame for receiving the occupant is located within the confines of relatively large, coaxial spaced wheels.

Vehicles an the general (FIGS. with which the present invention is concerned have been known but heretofore have had certain defects in respect of the cost of manufacture, maneuverability, and the like.

The present invention has, as a primary object, the provision of a two-wheeled vehicle of the nature referred to in which problems that have been encountered in connection with similar vehicles according to the prior art have been eliminated and in which the vehicle can be constructed relatively simply and at a relatively low cost.

SUMMARY OF THE INVENTION

According to the present invention, a pair of rather large wheels are provided in coaxial spaced relation with a frame between the wheels and having rollers distributed thereabout in rolling engagement with the wheels. The frame includes means for seating at least one occupant and the center of gravity of the frame, either with or without an occupant, is located below the common axis of the wheels so that the frame occupies a preferred rest position within the wheels favorable to receiving an occupant.

The location of the center of gravity of the frame below the common axis of the wheels also provides the basis for driving the wheels. This is accomplished by providing at least one relatively large chain circumferentially mounted on each of the wheels coaxially with the common axis of the wheels which is driven by means of an occupant controlled crank and sprocket assembly or an electric motor drive carried by the frame. As the chain is driven, the frame will shift about the common axis of the wheels thereby disturbing the balance of the wheels and frame and causing the wheels to rotate so as to return the assembly to the prior balanced condition. In this manner, the vehicle is propelled.

The wheels may be of solid rubber of a suitable density or, in a preferred form of the invention, pneumatic tires of a known type and size which are mounted on metal wheels. The wheels include an annular surface on the radially inward side, adapted for engagment with the rollers of the frame. The drive rollers may be of molded plastic material or any other suitable material, such as die cast metal, and may include a rubber-like periphery so as to permit quieter operation.

Specifically, the present invention contemplates an amusement vehicle comprising: a pair of coaxial wheels having inwardly facing annular surfaces thereon, a frame within the radial confines of the wheels extending axially between the wheels, a plurality of roller means rotatable on respective horizontal axes on the frame and distributed circumferentially in the planes of and supportingly engaging the annular surfaces for rotatably supporting the frame on the wheels, a seat in the frame which is adapted for seating an occupant, the center of gravity of the frame including any occupants seated therein being substantially lower than the common axis of the wheels, a chain mounted circumferentially on each of the wheels within the radial confines of the wheel and being concentric with the common axis of the wheels, and occupant controlled means carried by the frame for driving the chain to thereby propel the vehicle.

BRIEF DESCRIPTION OF THE DRAWINGS

The exact nature of the present invention will be more clearly comprehended upon reference to the following detailed description taken in connection with the accompanying drawings in which:

FIG. 10 is a fragmentary elevational view of an electric drive for the vehicle according to the present invention wherein portions of the supporting structure have been broken away to better illustrate the details of construction;

FIG. 11 is a sectional view taken along line 11—11 of FIG. 10; and

FIG. 12 is a schematic of the electrical wiring diagram for the electric drive.

DESCRIPTION OF THE PREFERRED EMBODIMENT

Figure 1:
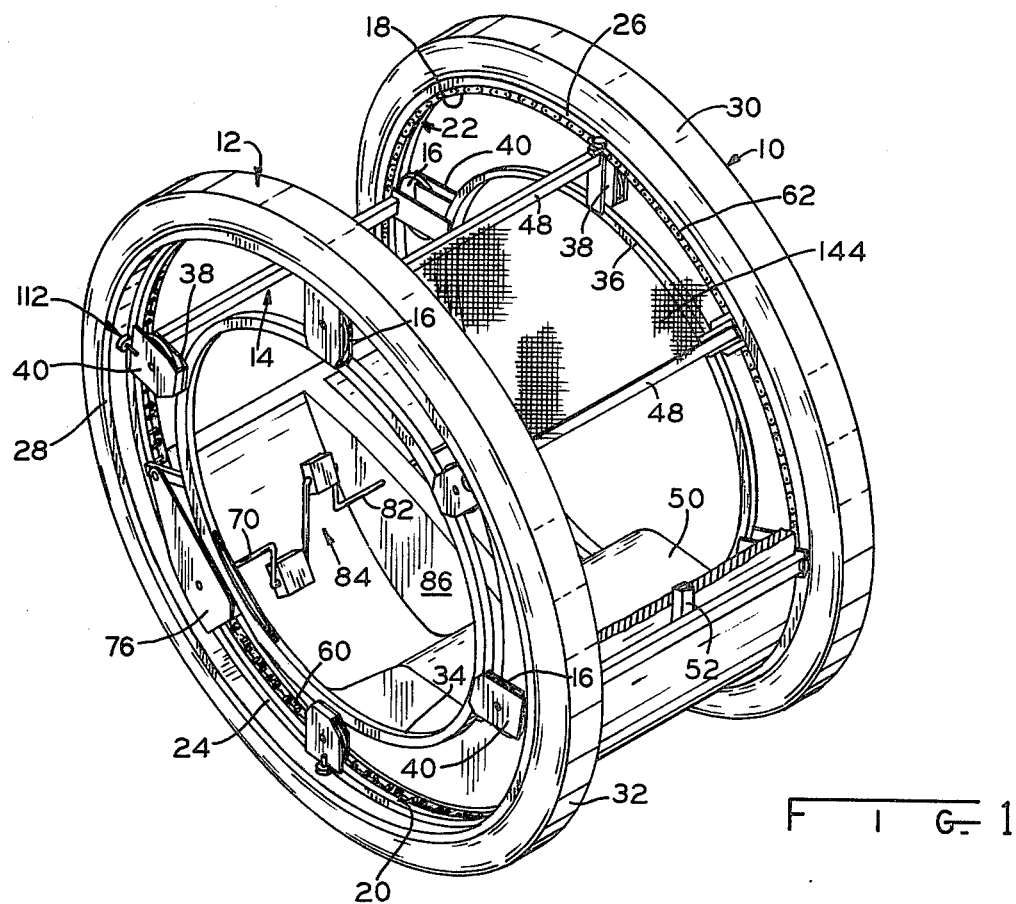
FIG. 1 is a perspective view of the vehicle according to the present invention.
Figure 2:
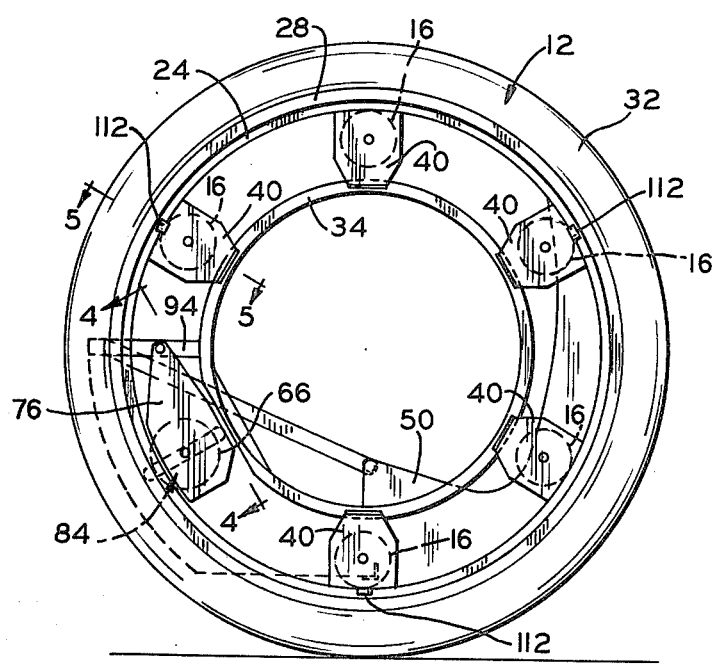
FIG. 2 is a side elevational view thereof.
Figure 3:
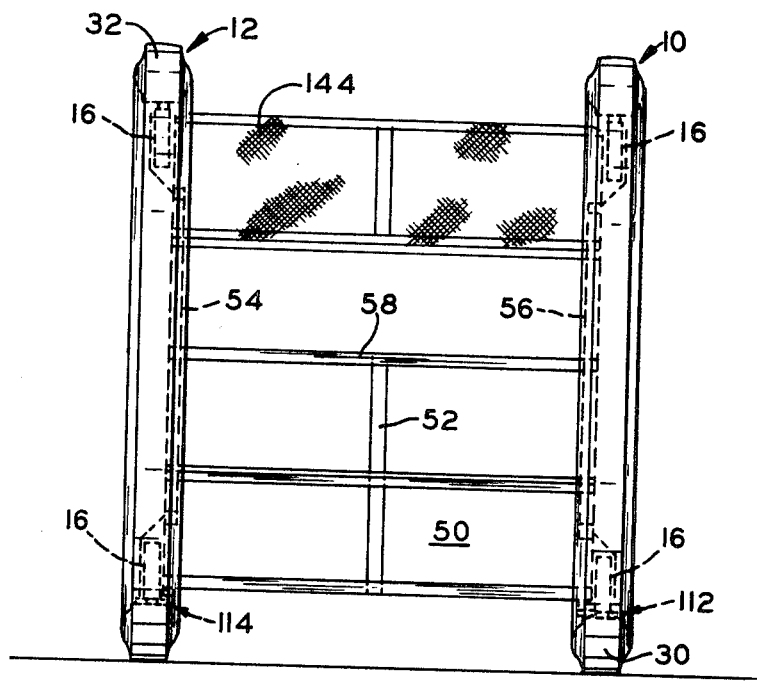
FIG. 3 is a rear elevational view thereof.

Referring now to the drawings, the vehicle according to the present invention comprises a pair of spaced coaxial wheels 10 and 12 within which is rotatably supported a generally circular frame 14 having circumferentially spaced rollers 16 which rollingly engage the radially inner surfaces of annular support rims 22 and 24. Support rims 22 and 24 are welded to respective wheel rims 26 and 28, which in turn have pneumatic tires 30 and 32 mounted thereon. Alternatively, tires 30 and 32 may be made of solid rubber.

Frame 14 comprises a pair of inner rings 34 and 36 which are tubular in construction and, similarly to the other structural members, are made of steel. Pairs of inner and outer brackets 38 and 40, respectively, which are welded to rings 34 and 36 and project radially outward therefrom, carry rollers 16. Rollers 16 are rotatably mounted between brackets 38 and 40 on bearings 42 which are mounted on pins 44. Pins 44 are welded to inner brackets 38 and plates 46, the latter being welded to inner rings 34 and 36. Structural elements 48, in the form of square steel tubing, are welded to corresponding plates 46. The frame is thus made substantially rigid and strong while still being of relatively light weight.

The seat 50, which is preferably made of molded one-piece plastic, is supported on three parallel frame members 52, 54 and 56 and horizontal frame member 58 which are fixedly secured to the remainder of the frame as by welding.

Figure 4:
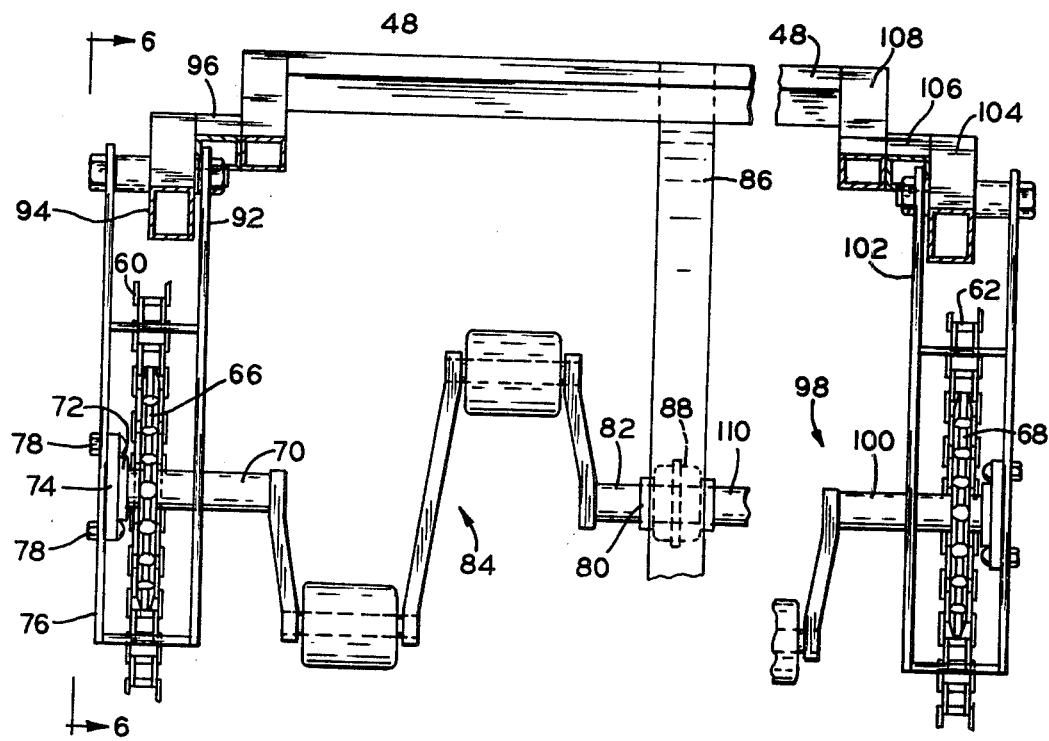
FIG. 4 is a sectional view taken along line 4—4 of FIG. 2.
Figure 5:
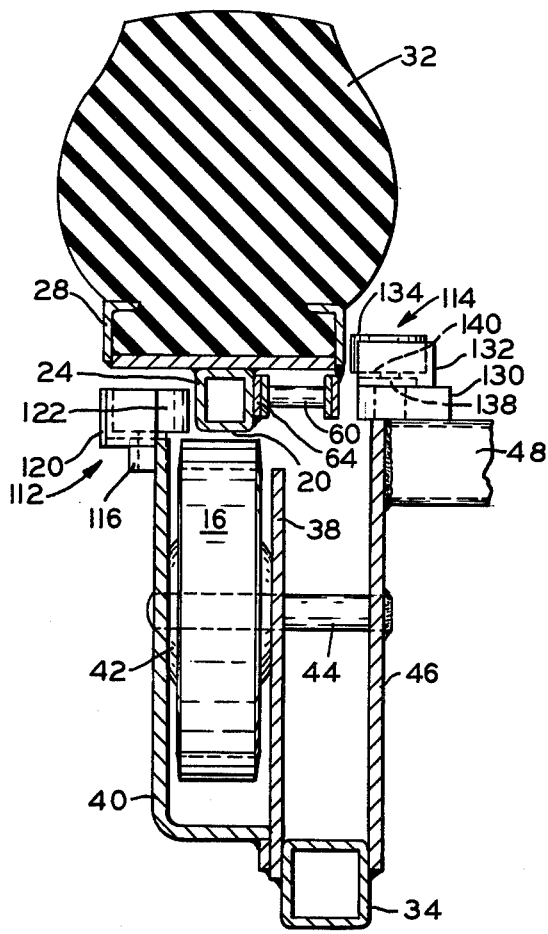
FIG. 5 is a sectional view taken along line 5—5 of FIG. 2.
Figure 6:
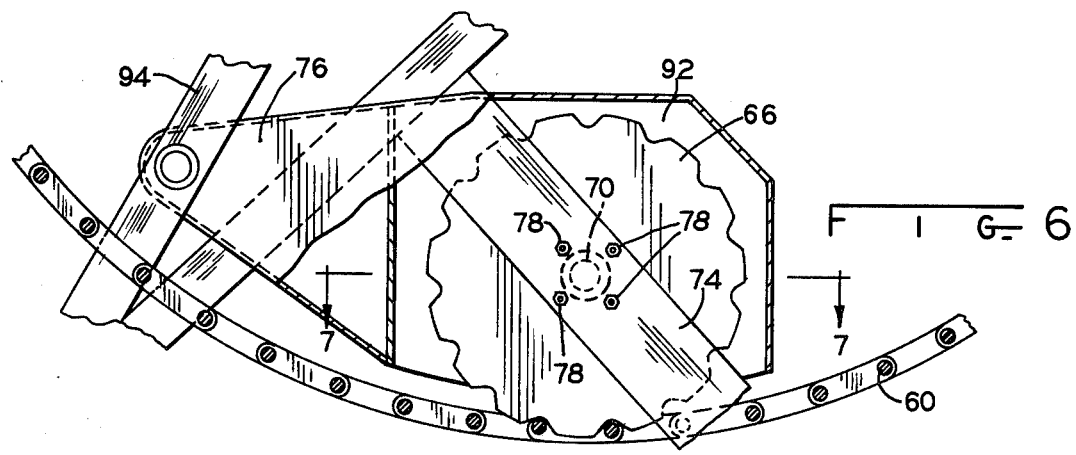
FIG. 6 is a sectional view taken along line 6—6 of FIG. 4 with portions thereof broken away to illustrate the details of construction.
Figure 7:
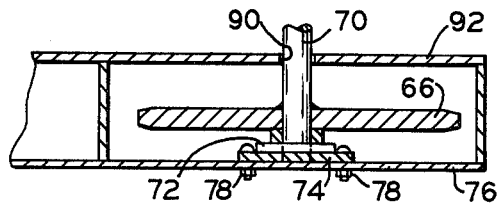
FIG. 7 is a sectional view taken along line 7—7 of FIG. 6.

The vehicle is powered by means of a chain and sprocket assembly shown in detail in FIGS. 4, 6 and 7. This assembly comprises a pair of relatively large extended pitch conveyor type chains 60 and 62 which are welded along one set of their side linking elements 64 (FIG. 5) to support rims 24 and 22, respectively. This results in a relatively rigid chain which is coaxial with the common axis of the wheels and connected thereto near the outer periphery so as to develop maximum torque. Chains 60 and 62 are driven by a pair of sprockets 66 and 68 rotatably supported on frame 14. The left sprocket 66 is welded to pedal shaft 70 which includes flange 72 and is rotatably received within flange bearing 74. Bearing 74 is secured to shield 76 by means of bolts and nuts 78. It will be seen that by virtue of the flange 80 on the other shaft 82 of pedal assembly 84 contacting the center partition 86 of seat 50, the assembly comprising sprocket 66 and pedal assembly 84 is secured in place against axial movement. Flange bearing 88 within partition 86 assures free rotation of pedal assembly 84. With reference to FIG. 7, it will be seen that pedal shaft 70 extends through an opening 90 in plate 92, which in turn is bolted to structural member 94 which extends between and is welded to inner ring 34 and structural member 96. Thus, flange bearings 74 and 88 and plates 76 and 92 are rigidly connected to frame 14 and rotatably support pedal assembly 84 and sprocket 66 thereon.

Sprocket 68 is rotatably supported within frame 14 in an identical fashion to sprocket 66. Pedal assembly 98 includes shaft 100 which extends through an opening in plate 102 and is welded to sprocket 68. Plate 102 is rigidly connected to frame 14 through structural members 104, 106 and 108 and cross member 48. It should be noted that pedal assemblies 84 and 98 are driven independently and there is no rigid connection between shafts 82 and 110. By driving pedal assemblies 84 and 98 at different rates, the vehicle is capable of being steered.

Figure 8:
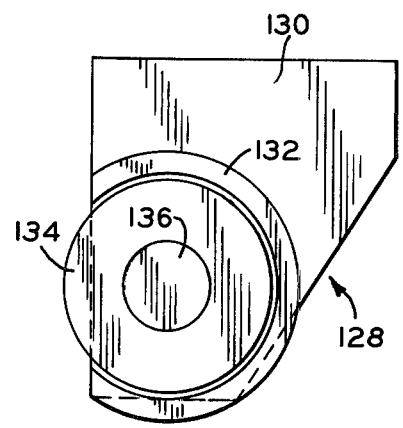
FIG. 8 is an enlarged plan view of one of the inner guide roller assemblies.
Figure 9:
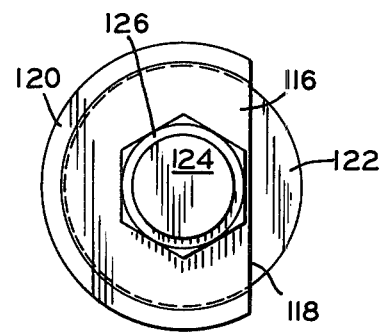
FIG. 9 is an enlarged plan view of one of the outer guide roller assemblies.

As indicated previously, the frame 14 is rotatably supported within wheels 10 and 12 by means of rollers 16. In order to prevent lateral shifting of frame with respect to wheels 10 and 12, guide roller assemblies 112 and 114 are provided as shown in detail in FIGS. 5, 8 and 9.

Outer guide rollers 112, which are provided on every other roller on both wheels 10 and 12, comprise a tubular member 116 having a flat side 118 which is welded flush against outer bracket 40, a circular shield 120 which is welded to member 116 and a bearing supported, rotatable guide roller 122, which includes a shaft 124 secured to member 116 by means of nut 126. As illustrated in FIG. 5, the bearing surface of roller 122 is positioned to rollingly engage support rim 22. Three rollers 16 for each of wheels 10 and 12 are provided with identical guide roller assemblies 112.

Inner guide roller assemblies 114 each comprise a mounting plate 130 welded to structural cross member 48, a circular shield 132 welded to plate 130, a bearing supported rotatable McGill #CF guide roller 134, which includes a shaft 136 rigidly secured to plate 130. Washers 138 and 140 serve as spacers between rollers 134 and plate 130. Six inner guide rollers 128 are provided on the same rollers 116 as outer guide rollers 122. The rolling surfaces of rollers 134 are positioned to engage wheel rims 26 and 28 so as to prevent axial inward shifting of wheels 10 and 12.

In order to provide protection to the occupants, seat 50 is provided with a relatively high back portion 142 and the top portion of the seating compartment is enclosed by a metal screen 144.

In order to propel the vehicle, the occupants turn pedal assemblies 84 and 98 with their feet so as to drive sprockets 66 and 68. Initially, sprockets 66 and 68 will begin to climb chains 60 and 62 because of the inertia of wheels 10 and 12. This creates an unbalanced condition due to the fact that the equilibrium or balanced position of frame 14 is such that its center of gravity is below the mutual axis of wheels 10 and 12. By maintaining pressure on the pedals 84 and 98, wheels 10 and 12 will begin to turn so as to shift the center of gravity of frame 10 to its rest position below the axis of the wheels 10 and 12. If pedal assemblies 84 and 98 are pumped at the same speed, the vehicle will travel in a straight line. To turn the vehicle to the right, the left pedal assembly 84 will be driven at a higher speed than right pedal assembly 98. Similarly, to turn the vehicle to the left, right pedal assembly 98 will be driven at a higher speed.

In a alternative embodiment (FIG. 10, 11 and 12), the chains 60 and 62 may be driven by sprockets, such as sprocket 146, driven by electric motors 148 and 150. Since the motor drives are identical, only one of them will be described in detail.

Motor 148 and cam speed reducer 149 are rigidly secured to frame 14 by means of mounting plate 152. Motor output shaft 154 is connected to drive shaft 156 by coupling 158. Drive shaft 156 is rotatably supported on flange bearings 160 and 162 which in turn are secured to bracket 164. sprocket 146 is drivingly connected to drive shaft 156 by clutch 166, which may be a Dalton No. 05D-225D clutch.

Referring now to FIG. 12, motors 148 and 150 are powered by 12 volt batteries 168, 169, 170 and 171. It will be noted that batteries 168 and 169 are connected in parallel and are connected in series with parallel connected batteries 170 and 171 so as to provide the necessary 24 volts for motors 148 and 150. Plug 172 and its cooperating receptacle 174 accomplish the aforementioned series connection by virtue of jumper 176. Switch 178 activates and deactivates the electric drive and switches 180 and 182 control the application of voltage to the individual motors 148 and 150, respectively. Switches 180 and 182 are Cutler and Hammer No. 10250T120 push button switches having 10250T2 and 10250T3 contact blocks. In their center positions, open circuits are provided between wires 184 and 186 whereas in their forward and reverse positions, respectively, voltage of reverse polarity is applied to motors 148 and 150 so that sprockets 146 can be driven in both the forward and reverse directions. By appropriate control of switches 180 and 182, the vehicle can be driven in the forward and reverse directions and can be turned.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the limits of the appended claims.

What is claimed is:

1. A vehicle comprising:
   a pair of coaxial wheels having inwardly facing annular surfaces,
   a frame generally within the radial confines of said wheels extending axially between said wheels,
   an inwardly extending annular support rim on the annular surface of each of said wheels, said support rims each having an inner surface and a side surface,
   a plurality of rollers means rotatable on respective horizontal axes on said frame and distributed circumferentially in the planes of and supportingly engaging the inner surfaces of said support rims so as to rotatably support said frame on said wheels,
   a seat in said frame adapted for seating an occupant,
   the center of gravity of said frame including any occupants seated therein being substantially lower than the common axis of said wheels,
   a chain rigidly secured circumferentially to each of said wheels within the radial confines of said wheels and concentric with the common axis of said wheels, each of said chains being axially displaced from the support rim for its respective said wheel,
   a rotatable sprocket engaged with each said chain, occupant actuated means drivingly connected to said sprockets, and
   a plurality of first guide rollers connected to said frame for rotation about respective axes which intersect the common axis of said wheels, said rollers engaging the side surfaces of respective said support rims.

2. The vehicle of claim 1 wherein said occupant actuated means drives said sprockets independently of each other so as to enable steering of the vehicle.

3. The vehicle of claim 2 wherein said occupant actuated means comprises manually turned crank means connected to said sprockets.

4. The vehicle of claim 3 wherein said crank means includes two independently mounted pedal operated cranks connected respectively to said sprockets.

5. The vehicle of claim 1 wherein said occupant actuated means comprises cranks manually turned by the occupant.

6. The vehicle of claim 1 wherein said rims each includes a second side surface concentric with the common axis of said wheels, and wherein said chains are rigidly secured to respective said second side surfaces.

7. The vehicle of claim 6 wherein said chains are rigidly secured also to the respective inwardly facing annular surfaces of said wheels.

8. The vehicle of claim 1 wherein said wheels each includes an annular guide roller surface, said guide roller surfaces are concentric with the common axis of said wheels and generally perpendicular to respective said inwardly facing surfaces, and including a plurality of second guide rollers engaging said guide roller surfaces.

9. The vehicle of claim 1 wherein said wheels each includes an annular guide roller surface which is concentric with the common axis of said wheels and generally perpendicular to respective said inwardly facing surfaces, and including a plurality of second guide rollers engaging said guide roller surfaces.

10. The vehicle of claim 9 wherein respective axes of said second guide rollers intersect the common axis of said wheels.

11. The vehicle of claim 1 wherein said frame comprises: spaced ring members coaxial with said wheels, a plurality of bracket means fixed to each said ring member in circumferentially spaced relation and each said bracket means comprising a pair of spaced bracket elements rotatably supporting a respective said rollers means therebetween, and structural elements extending between and fixed to respective said bracket means.

12. The vehicle of claim 1 wherein said occupant actuated means comprises at least one electric motor.

13. The vehicle of claim 12 including a clutch frictionally connecting said motor to at least one of said sprockets.

14. The vehicle of claim 1 wherein said occupant actuated means comprises a pair of electric motors and said sprockets are respectively driven thereby.

15. The vehicle of claim 14 wherein said motors are reversible and including means for independently controlling said motors.

UNITED STATES PATENT AND TRADEMARK OFFICE
CERTIFICATE OF CORRECTION

PATENT NO. : 4,192,395
DATED : March 11, 1980
INVENTOR(S) : Gerald L. Barber

It is certified that error appears in the above-identified patent and that said Letters Patent are hereby corrected as shown below:

Col. 1, line 15, Change "an" to -- of --.

Col. 1, line 15, Change "FIGS." to -- nature --.

Col. 6, line 11, Claim 8 - change "1" to -- 7 --.

Col. 6, line 31, Claim 11 - Change "rollers" to -- roller --.

Signed and Sealed this

Seventeenth Day of June 1980

[SEAL]

Attest:

SIDNEY A. DIAMOND

Attesting Officer

Commissioner of Patents and Trademarks